(12) United States Patent
Hager et al.

(10) Patent No.: US 7,166,432 B2
(45) Date of Patent: *Jan. 23, 2007

(54) COMPOSITIONS AND METHODS FOR GENETIC ANALYSIS

(75) Inventors: Jörg Hager, Mennecy (FR); Peter Brooks, Evry (FR)

(73) Assignee: Integragen, Evry (FR)

( * ) Notice: Subject to any disclaimer, the term of this patent is extended or adjusted under 35 U.S.C. 154(b) by 269 days.

This patent is subject to a terminal disclaimer.

(21) Appl. No.: 10/655,598

(22) Filed: Sep. 5, 2003

(65) Prior Publication Data

US 2005/0053947 A1   Mar. 10, 2005

Related U.S. Application Data

(63) Continuation-in-part of application No. 09/936,299, filed on Dec. 20, 2001, now Pat. No. 6,887,666.

(30) Foreign Application Priority Data

Mar. 12, 1999   (DE) ................. 199 11 139

(51) Int. Cl.
   *C12Q 1/68* (2006.01)
   *C12P 19/34* (2006.01)
(52) U.S. Cl. .................... 435/6; 435/91.2
(58) Field of Classification Search ............ 435/6, 435/91.2
   See application file for complete search history.

(56) References Cited

U.S. PATENT DOCUMENTS

| | | | |
|---|---|---|---|
| 5,750,335 A | 5/1998 | Gifford | |
| 5,871,927 A * | 2/1999 | Lin et al. ................ | 435/6 |
| 5,879,886 A | 3/1999 | Meo et al. | |
| 6,287,825 B1 * | 9/2001 | Weissman et al. ........ | 435/91.2 |
| 6,887,666 B1 * | 5/2005 | Hager .................... | 435/6 |

FOREIGN PATENT DOCUMENTS

| | | |
|---|---|---|
| WO | WO 89/12695 A | 12/1989 |
| WO | WO 93/22457 A | 11/1993 |
| WO | WO 93/22462 A | 11/1993 |
| WO | WO 95/12688 A | 5/1995 |
| WO | WO 95/12689 A | 5/1995 |
| WO | WO 96/17082 A | 6/1996 |
| WO | WO 96/23903 A | 8/1996 |
| WO | WO 96/41002 A | 12/1996 |
| WO | WO 99/25872 A | 5/1999 |

OTHER PUBLICATIONS

Klein et al., 96 Proc. Nat'l. Acad. Sci. 4494-99 (1999).
Lishanski et al., 91 Proc. Nat'l. Acad. Sci. 2674-78 (1994).
Cheung et al., 47 Genomics 1-6 (1998).
McAllister et al., 47 Genomics 7-11 (1998).
Smith et al., 93 Proc. Nat'l. Acad. Sci. 4374-79 (1996).

* cited by examiner

*Primary Examiner*—Kenneth R. Horlick
*Assistant Examiner*—Christopher M. Babic
(74) *Attorney, Agent, or Firm*—Preston Gates Ellis & Rouvelas Meeds LLP

(57) ABSTRACT

The present invention relates to genetic mapping of complex quantitative and qualitative traits. This invention more particularly relates to compositions and methods to identify identical DNA fragments from two different DNA sources. The methods allow the amplification of the DNAs, their labelling, and the separation of perfectly matched DNAs from imperfectly matched DNAs or from DNAs formed through hybridization from the same source (e.g., homohybrids). The invention may be used to identify genes or gene mutations, which are relevant to pathological conditions or particular traits.

12 Claims, 3 Drawing Sheets

Grandchild

Grandpare

GC + GP

IBD-

COMPOSITIONS AND METHODS FOR GENETIC ANALYSIS

CROSS-REFERENCE TO RELATED APPLICATIONS

The present invention is a continuation in part and, in accordance with the provisions of 35 U.S.C. §120, claims the benefit of patent application Ser. No. 09/936,299, filed on 20 Dec. 2001, now U.S. Pat. No. 6,887,666 which is expressly incorporated fully herein by reference.

FIELD OF INVENTION

The present invention relates to the field of genomics and genetic analysis, more particularly to genetic mapping of complex quantitative and qualitative traits. More particularly, the present invention provides compositions and methods to analyze genetic information from different sources in order to identify relevant therapeutic genes or mutations. This invention more particularly relates to compositions and methods to identify identical DNA fragments from different DNA sources. The methods allow the separation of perfectly matched DNAs from imperfectly matched DNAs or from DNAs formed through hybridization from the same source (e.g., homohybrids). The methods represent alternative and/or improved variants of Genomic Mismatch Scanning (GMS), and provides significant improvements over the GMS procedure, such as working with smaller starting amounts of DNA, specific amplification, and decreased cost and decreased number of reaction steps.

BACKGROUND

A major challenge for biology and medicine today is the identification of genes implicated in common, complex, human diseases like asthma, type 2 diabetes mellitus, obesity etc. The identification of such genes is usually carried out by performing linkage and/or association studies in large family or patient samples. These studies can be performed using a variety of genetic markers (sequences in the genome which differ between individuals, i.e., polymorphisms). The most widespread polymorphisms used are microsatellite markers consisting of short, specific repeat sequences or single nucleotide polymorphisms (SNPs) that differ in just one nucleotide. Different analysis technologies have been developed to genotype these markers such as, gel-based electrophoresis, DNA hybridization to an ordered array, and identification using mass spectrometry.

A major goal of genetic analysis is to link a phenotype (i.e., a qualitative or quantitative measurable feature of an organism) to a gene or a number of genes. Historically there are two genetic approaches that may be applied to identify genetic loci responsible for a phenotype, familial linkage studies and association studies. Whatever the approach is, the genetic studies are based on polymorphisms, i.e., base differences in the DNA sequence between two individuals at the same genetic locus. The existence of sequence differences for the same genetic locus is called allelic variation and different alleles of a gene can result in different expression of a given phenotype.

Linkage analysis has been the preferred method to identify genes implicated in many diseases both monogenic and multigenic, but where only one gene is implicated for each patient. Linkage analysis follows the inheritance of alleles in a family and attempts to link certain alleles to a phenotype (e.g., a disease). In other words, one looks for shared alleles between individuals with the same phenotype that are identical by descent (IBD), i.e., are derived from the same ancestor. In order to be reasonably powerful for statistical analysis, the studied polymorphisms have to fulfill several criteria such as high heterozygosity (this increases informativity), geneome wide representation, and dectability with standard laboratory methods.

A type of polymorphisms fulfilling most of these criteria is a microsatellite marker. Microsatellite markers are repetitive sequence elements of two (e.g., CA), three or four bases. The number of repetitions is variable for a given locus, resulting in a high number of possible alleles, i.e., high heterozygosity (70–90%). Microsatellites are widely distributed over the genome, and presently, almost 20,000 microsatellite markers have been identified and mapped (coverage ~0.5–2 mega bases).

Microsatellite markers are the preferred genetic markers for linkage analysis. Genotyping of these markers may be performed by amplifying the alleles by PCR followed by size separation in a gel matrix (slab gel or capillary). For the study of complex human diseases usually about 400–600 microsatellite markers are used that are distributed in regular distances over the whole genome (about every 10–15 mega bases).

There are many advantages associated with familial linkage studies such as established, well mapped marker systems (e.g., microsatellite markers); well developed statistical analysis tools; high informativity; allows for the parallel dissection of several loci involved in a genotype (meta-analysis); and the existence of well developed comparative maps between species.

There are, however, many disadvantages of familial linkage studies. These include high costs (high costs associated with performing multiple polymerase chain reactions, allele scoring, and fluorescent marker labelling), generally slow because although some multiplexing can be achieved, high parallelization is not possible (no microsatellite DNA chips), statistical power is limited to dissecting small effects, results are dependent on allele frequencies and heterozygosity, extensive family collections with affected individuals are necessary (200–2000 individuals), and IBD regions usually extent over large regions unsuitable for direct gene cloning, often 10–15 mega bases (low resolution).

Alternatively, the other approach to genetic analysis relies on association studies. In contrast to linkage studies, which follow alleles in families, association studies follow the evolution of a given allele in a population. The underlying assumption is that at a given time in evolutionary history one polymorphism became fixed to a phenotype because either the polymorphism is itself responsible for a change in phenotype or the polymorphism is physically very close to such an event and is therefore rarely separated from the causative sequence element by recombination (i.e., the polymorphism is in linkage disequilibrium with the causative event). This is a fundamental difference between linkage and association.

In a genetically acquired trait, however, there must be linkage of a sequence to the causative allele. If one could perform an infinitely dense linkage experiment, there is no a priori reason that there might be a single (or very few) causative allele(s) in the population (i.e., there is association). This has major implications on statistical analysis. Many monogenic diseases such as maturity onset diabetes of the young (MODY) where almost each family carries a different mutation in the same gene are examples for linkage without association. In this case, association studies would have failed to identify the locus. As association studies postulate the existence of one given allele for a trait of interest one wants the markers for an association study to be simple. Accordingly, the markers of choice for these studies are single nucleotide polymorphisms (SNPs). These polymorphisms show a single base exchange at a given locus (i.e., they are bi-rarely tri-allelic). Association studies can be carried out either in population samples (cases vs. controls) or family samples (parents and one offspring where the transmitted alleles constitute the "cases" and the non-transmitted the "controls").

The main advantages of using SNPs for association studies are that SNPs are relatively easy to type (any technology allowing single base discrimination e.g., DNA chips, mass spectrometry), SNPs are very abundant in the human genome (on average one SNP every 300–1000 bases), and association allows for defining a relatively well-delimited genetic interval (usually several kilo bases).

There are many disadvantages, however, associated with using SNPs for association studies. First, associations may only be detected at very high resolutions (unsuitable high number of SNPs must be screened, probably >100.000). Second, as association cannot be postulated to exist a priori, the statistical rules for multiple testing apply (i.e., the result for each additional SNP tested must be corrected for) resulting in an unsuitable high threshold for positive association when thousands of markers are tested or in other words, an inflation of false positive results at nominal significance levels is observed. Therefore, new statistical tools may be needed. Third, association tests are usually carried out as two by two tests (i.e., polymorphisms at a given locus are tested against a phenotype). Fourth, meta-analyzes are difficult if not impossible to carry out for thousands of markers. Fifth, like linkage, association analysis is influenced by allele frequency. Sixth, integrated genetic maps for SNPs do not presently exist. Seventh, large sample collections are needed. And finally, current technology is too expensive to genotype thousands of samples for thousands of SNPs (PCR, costs of chip technology, instrumentation) and discrimination is still not reliable enough (e.g., Affymetrix SNP chip).

Accordingly, there is a need for improved or alternative genetic analysis methods that would overcome the drawbacks of these prior art technologies. In this regard, the ideal genotyping technology should be capable of looking for both linkage and association and, at the same time, avoid the disadvantages of these methods. It should be reliable, allow genome wide analysis, be capable of restraining phenotype-linked loci to small intervals, should be simple to perform and analyze, and be cost effective.

The genomic mismatch scanning ("GMS") method appears to fulfill most of these requirements. Genomic mismatch scanning was developed in the "mismatch repair community" which had little to do with the human linkage community trying to find the genes involved in human traits. More particularly, in 1993, Nelson et al., described a method that allowed for the detection and quantification of the relationship between different strains of yeast. Nelson et al., 61 Am J Hum Genet., 111–119 (1993). This method consists of mixing the DNAs from different yeast strains and destroying everything that is not identical using a set of mismatch repair enzymes. Apart from the research community working on mismatch repair the article had no major impact. It seemed logical, however, that this technology could also be applied to detect identical regions in humans. In this regard, McAllister et al., published a proof-of-principle article where they described the identification of a human disease locus on chromosome 11 using GMS. McAllister et al., 47 Genomics, 7–11 (1998).

Briefly the method consists of (1) restriction of the DNA from two individuals; labeling one of the DNAs by methylation; (2) mixing of the two DNAs thereby creating a mixture of heteroduplexes between the two DNAs, which are hemimethylated, and homoduplexes of the original DNAs derived through renaturation of each individuals DNA with itself. As the DNA of one individual was completely methylated and the other non-methylated the resulting homoduplexes are also methylated or non-methylated; (3) the non-informative homoduplexes are eliminated by several enzymatic steps involving restriction enzymes that only digest fully methylated or fully unmethylated DNA and a final digestion of the DNA by Exo III nuclease; (4) the remaining heteroduplexes which were formed between the DNAs from the two individuals consist of few fragments which are 100% identical in their sequence composition (the fragments of interest) and those which, due to the heterogeneity between individuals, show sequence differences (i.e., bases are mismatched at those sites); (5) the mismatched DNA fragments are eliminated by using an enzymatic DNA mismatch repair system consisting of three proteins (mut S, mut H, mut L) which recognize these mismatches and cut the DNA strands at a specific recognition sequence (GATC); and (6) the remaining 100% identical DNA heterohybrids can then be identified by specific PCR amplification where the presence or absence of an amplification product is scored.

There are many advantages of the method over the classical linkage and association studies. First, the method allows unambiguous detection of IBD fragments between individuals, as it is not dependent on allele frequencies or marker heterozygosity. Second, the method is not limited on the use of polymorphic markers. Any sequence can be used for scoring as long as some sequence and mapping information is available. No allele discrimination is necessary. The detection signal is digital (i.e., presence or absence of a fragment). Third, the detection method can be scaled to any density. Finally, due to the unambiguous IBD detection and independence of allele frequency, fewer individuals have to be screened (e.g., 100 sib-pairs give the same power to detect regions of linkage as 400–600 sib-pairs in the classical linkage analysis).

The classical GMS methodology, however, has some disadvantages that make its use as a routine tool for genetic screening difficult. First, the amount of DNA for a single experiment is large due to the loss of material throughout the procedure. Usually 5 µg of DNA are needed. Depending on the extraction method this often constitutes more than half the DNA available in a collection. Second, the methylation of one of the DNAs is not 100% efficient, i.e., some of the heteroduplexes can not be distinguished and are lost and some of the homoduplexes of the "methylated" individuals DNA will actually be hemimethylated after the hybridization step and therefore result in background at the detection level (as the DNA from one individual is a priori 100% identical with itself). Third, as exo III nuclease digestion plays a central part in the technology, only restriction enzymes creating 3' sticky ends can be used for the initial digestion of the DNA (typically Pst I is employed). These enzymes are rare and restrict the choice for the restriction of the DNA and therefore the constitution of the created fragments. Fourth, the procedure described involves multiple handling, tube changing and DNA precipitation steps. Especially the latter makes the procedure cumbersome, error prone and unsuitable for automation, thereby restricting its routine use for large sample cohorts as are typically needed for disease gene identification studies. Also, efficient recognition of non-identical, mismatched DNA sequences by the mut SHL system relies on the presence of the recognition sequence GATC in a given fragment. Absence of the sequence results in background signal due to non-eliminated mismatched DNA. Finally, the labeling of one of the DNAs by methylation allows only a two by two pair-wise comparison between different DNAs.

Indeed, there is a need in the art for genetic analysis techniques and compounds that are more convenient, easy to perfomm, reliable and applicable to broader populations of genetic material. Other objects, features and advantages of the present invention will become apparent from the following detailed description. The detailed description and the specific examples, however, indicate only preferred embodiments of the invention. Various changes and modifications within the spirit and scope of the invention will become apparent to those skilled in the art from this detailed description.

SUMMARY OF THE INVENTION

The present invention provides novel genetic analysis methods that overcome the drawbacks of the prior art GMS technique. In specific embodiments, the invention discloses alternative and/or improved variants based on the concept of GMS that circumvents most of the disadvantages of the classical approach mentioned above.

In a particular embodiment, a method is provided which allows the identification of identical DNA sequences from different sources from a small initial amount of genomic DNA. Further, a method is also provided to amplify nucleic acids from different populations with a primer comprising a label specific to each population. Further yet, a method is also provided to identify genomic DNA regions that are relevant to pathological conditions or a particular trait.

In another embodiment, a method is provided for preparing heterohybrid nucleic acid molecules from two or more nucleic acid populations, comprising the coupling of a differently composed adaptor molecule to the nucleic acid in each of the populations, specifically at both ends thereof, so that each population has a distinct adaptor molecule, prior to a hybridization step.

A particular embodiment of this invention resides more specifically in methods for separating identical DNA fragments from complex mixtures of at least two nucleic acid populations (from different sources), comprising hybridizing the at least two populations and separating the identical heterohybrids formed, where each nucleic acid population is coupled to a differently composed adaptor molecule.

More particularly, an embodiment of the present invention resides in methods for the identification, isolation or separation of identical nucleic acid fragments from a mixture of at least two nucleic acid populations from different sources, comprising a) separate digestion of the nucleic acids of the at least two populations with at least one restriction enzyme, b) ligation of differently composed adaptor sequences to the restriction fragments for each population, the adaptor sequence adding a distinct label for each of the at least two nucleic acid population, c) hybridization with each other of the ligation products generated in b), and d) identification, isolation or separation of the identical, fully matched, heterohybrid fragments. This embodiment is advantageous since it allows the selection of heteroduplexes without methylation prior to the mismatch repair selection (i.e., without restriction regarding restriction enzymes).

In yet another embodiment, methods are also provided to identify DNA regions that are relevant to pathological conditions or a particular trait. The methods comprise hybridizing at least two nucleic acid populations from different sources having the particular trait or pathology, and separating the identical heterohybrids formed which contain DNA regions that are relevant to the pathological conditions or particular trait, where the nucleic acid populations comprise nucleic acids coupled to differently labelled adaptor.

In a further embodiment, methods are also provided for preparing heterohybrid nucleic acid molecules from two or more nucleic acid populations. The methods comprise an amplification step of each nucleic acid population prior to a hybridization step, the amplification specifically comprising the coupling of an adaptor molecule to each nucleic acid in the populations, more specifically at both ends thereof, and performing an amplification using a primer comprising at least a sequence region that is complementary to a sequence region of the adaptor molecule.

A particular embodiment of this invention resides more specifically in methods for separating identical DNA fragments from complex mixtures of at least two nucleic acid populations (from different sources), comprising hybridizing the at least two populations and separating the identical heterohybrids formed, where the nucleic acid populations comprise amplified nucleic acids.

More particularly, an embodiment of the present invention resides in methods for the identification, isolation or separation of identical nucleic acid fragments from a mixture of at least two nucleic acid populations from different sources. The methods comprise: a) separate digestion of the nucleic acids of the at least two populations with at least one restriction enzyme; b) ligation of specific adaptor sequences to the restriction fragments; c) amplification of the adaptor-ligated restriction fragments generated in a) and b) using adaptor-specific primers; d) hybridization of the amplification products from the different nucleic acid populations with each other; e) identification, isolation or separation of the identical, fully matched, heterohybrid fragments. This embodiment is advantageous since it allows the amplification of the DNAs (i.e., the use of small amounts of starting material) and the selection of heteroduplexes without methylation prior to the mismatch repair selection (i.e., without restriction regarding restriction enzymes).

Also, the present invention provides methods to identify DNA regions that are relevant to pathological conditions or a particular trait, comprising hybridizing at least two nucleic acid populations from different sources having the particular trait or pathology, and separating the identical heterohybrids formed which contain DNA regions that are relevant to the pathological conditions or particular trait, where the nucleic acid populations comprise amplified and/or pre-selected nucleic acids.

Further, particular embodiments provide methods that decrease the number of steps from DNA hybrid formation to selection of IBD fragments and does not involve any DNA precipitation steps. The methods comprise the digestion of homohybrids with an exonuclease and heterohybrids with the mutS, L and H in a single step and purification of the products by ultra filtration. This embodiment is advantageous since it significantly simplifies the procedure, allows working with large sample numbers using standard multi-well plates and is readily implementable on automated platforms.

Other aspects of the present invention reside in compositions, kits, and diagnostic assays.

DETAILED DESCRIPTION OF THE INVENTION

Figure 1:
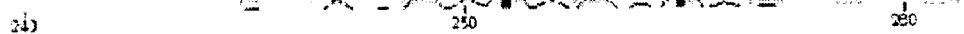
FIG. 1 shows the elimination of non-identity-by-descent DNA through the method according to the present invention. The first panel shows a microsatellite allele profile for an CEPH individual that is a grandchild of the two following individual. The allele at 255 base pairs was inherited by the grandparent in panel 2. Panel 2: Microsatellite profile for a grandparent. Panel 3: Profile of alleles after mixing the DNAs from the two individuals. Panel 4: Allele profile after the process according to the present invention. Only the IBD allele has been recovered. The non-IBD fraction has been completely eliminated from the mixture.
Figure 1:
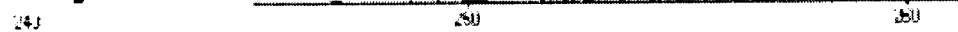
Figure 1:
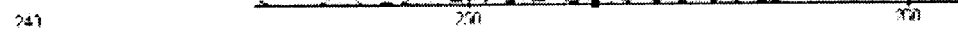
Figure 1:
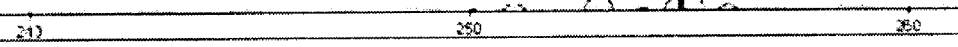

It is understood that the present invention is not limited to the particular methodology, protocols, cell lines, vectors, and reagents, etc., described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include plural reference unless the context clearly dictates otherwise. Thus, for example, a reference to "an antibody" is a reference to one or more antibodies and equivalents thereof known to those skilled in the art and so forth.

Unless defined otherwise, all technical and scientific terms used herein have the same meanings as commonly understood by one of ordinary skill in the art to which this invention belongs. Preferred methods, devices, and materials are described, although any methods and materials similar or equivalent to those described herein can be used in the practice or testing of the present invention. All references cited herein are incorporated by reference herein in their entirety.

As described above, the present invention provides methods for the identification, isolation or separation of identical nucleic acid fragments from a mixture of at least two nucleic acid populations. A specific embodiment provides a method comprising the steps of a) performing separate digestion of the nucleic acids of the at least two populations with at least one restriction enzyme; b) ligation of a differently composed adaptor sequence to the restriction fragments of each nucleic acid population, the adaptor sequence adding a distinct label for each of the at least two nucleic acid populations; c) hybridization of the ligation products generated in b) with each other; and d) identification, isolation or separation of identical, fully matched, heterohybrid fragments.

Alternatively, the present invention provides methods for the identification, isolation or separation of identical nucleic acid fragments from a mixture of at least two nucleic acid populations, comprising a) separate digestion of the nucleic acids of the at least two populations with at least one restriction enzyme, b) ligation of a specific adaptor sequence to the restriction fragments, c) amplification of the adaptor-ligated restriction fragments generated in a) and b) using an adaptor-specific primer, d) hybridization of the amplification products from the different nucleic acid populations with each other, and e) identification, isolation or separation of identical, fully matched, heterohybrid fragments.

The invention may be used to analyze various nucleic acid populations, especially with the objective to identify (or separate) identical regions present therein. Typically, the nucleic acid populations are genomic DNA, in particular, mammalian genomic DNA, such as human genomic DNA. In a specific embodiment, the nucleic acid populations are human genomic DNA from different subjects that share a trait of interest for a particular a phenotype or pathology. In this embodiment, the method of the present invention is directed to identifying genetic markers of the pathology, or genes (mutations) involved in or responsible for pathology.

The nucleic acid populations may also be genomic DNA from other mammalian species, such as bovine, ovine, canine, sheep, goats, and the like. In particular, the genomic DNA may be prepared from animals (of the same species) sharing a particular trait (high meat, high milk production, etc.).

The nucleic acid populations may also be genomic DNA from other sources, including prokaryotic (bacteria, pathogenic organisms, etc.), lower eukaryotic (yeasts, etc.), plants, viruses, and the like.

While the nucleic acid population may comprise the total genomic DNA of a cell (or tissue or organism), or a complete genomic library, for instance, it should be noted that a screening or a selection of the starting nucleic acids may also be performed. In particular, the nucleic acid population may be an isolated chromosome (or group of chromosomes).

In performing the instant invention, two or more nucleic acid populations may be used, originating from different sources. For example, about 2 to about 10, about 20, about 50, about 100, about 200 or about 300 nucleic acid populations may be used. In specific embodiments, nucleic acid populations in the range of about 2 to about 10 may be used. In other embodiments, nucleic acid populations in the range of about 2 to about 100 may be used.

In one embodiment of the present invention, the nucleic acid populations may be separately digested to provide restriction fragments. The term "separately" as used herein, indicates that each population is individually subjected to the digestion, i.e., without being mixed together. One or several restriction enzymes may be used. Specifically, the same restriction enzyme(s) may be used for each nucleic acid population. The restriction enzyme(s) may be chosen according to practical considerations, such as size of the generated fragments, specificity for DNA species, enzymatic activity, ease of use, etc. In a specific embodiment, the restriction enzyme provides, on an average, medium length restriction fragments, and more particularly fragments between about 2 and about 10 kilo bases (kb). Such restriction enzymes include for instance six base recognition site enzymes such as Apa I (~2 kb), Bam HI (~5 kb), Bgl I+II (~3 kb), Hind III (~4 kb), Nar I (~4 kb), Sma I (~4 kb) or Xba I (~5 kb). In a specific embodiment, one single restriction enzyme may be used that provides, on an average, restriction fragments in the range of about 2 to about 10-kb.

In a particular embodiment, the restriction fragments may be selected prior to the subsequent ligation and/or amplification step. In particular, the restriction fragments may be size-selected to allow a uniform amplification of all fragments. Size selection may be performed on a gel or by any other technique. On an agarose gel, the restriction fragments are size separated in an electric field beside a size standard for orientation. Fragments in the particular size range may be cut from the gel and may be extracted from the agarose using standard methods (e.g., gel extraction kit Quiaex II, Quiagen AG, Germany). Size separation may also be achieved using column separation with a sieving material like polyacrylamide, sephadex etc.

In addition, the restriction fragments may be cloned into any suitable vector, prior to the amplification step. The vector may be any plasmid, phage, virus, cosmid, artificial chromosome (YAC, BAC), etc. In particular, the restriction fragments may be cloned in a chromosome- and/or sequence-specific manner. In a particular embodiment, the method thus comprises (i) separate digestion of the nucleic acid populations (e.g., genomic DNA from at least two different sources) and (ii) cloning of (certain) restriction fragments into a vector, in a chromosome- and sequence-specific manner (e.g., through homologous recombination). This cloning step may be used to select certain fragments for further analysis, without analyzing the entire DNA population.

Another aspect of this invention resides in the use of adaptor molecules that allows the selection of heteroduplexes from the homoduplexes without methylation prior to the mismatch repair selection (i.e., without restriction regarding restriction enzymes). Moreover, the use of adaptor molecules facilitates specific amplification of the nucleic acids and specific treatment of the samples to increase the selectivity of the identification method.

Adaptor molecules may be, in particular, short double stranded DNA fragments (or oligonucleotides) with known sequence composition. More specifically, the adaptor molecules may be in the range of about 5 to about 100 base pair long double stranded DNA molecules, and even more specifically in the range of about 5 to about 50 base pair long. The adaptor molecules allow the introduction of sequence features that greatly improve the genetic analysis procedure.

More particularly, the introduction of these adaptors has many advantages. First, the DNA may be amplified by PCR prior to the genetic analysis (e.g., GMS) procedure allowing starting off with less material (in the range of about 100 to about 500 ng). Only one amplification per experiment, using a single primer sequence may be necessary, making this method cost effective. Second, the adaptor sequence is specifically designed to include the mut HL recognition sequence (GATC), allowing all mismatched fragments to be removed from the mixture, thereby increasing the selectivity and reducing the background signal. Finally, the adaptor molecule may also comprise a recognition site for a restriction enzyme that creates 3' sticky ends, such as Aat III. In a specific embodiment, the adaptor molecule may be in the range of about 5 to about 100 base long (double-stranded) oligonucleotide comprising at least one GATC motif.

By "differently composed adaptor molecules," it is intended that the adaptor molecules for each population has a distinct molecular feature (e.g., composition, length, nature, etc.), so that, upon mixing together the populations, homoduplexes and heteroduplexes may be discriminated. The differently composed adaptor molecules may have a unique end-sequence. The differently composed adaptor molecules may also have a chemical activity or modified nucleotides, which provide a means to distinguish between the products from different DNA sources. Specifically, the differently composed adaptor molecules have a unique end-sequence for each nucleic acid population.

In a particular embodiment, the adaptor molecules for each population may contain at least one region that is not able to hybridize (i.e., to form a double stranded molecule) with at least one region of the adaptor molecules of the other populations. More particularly, the non-complementarity region is located at the end(s) of the adaptor sequence, so that the adaptor molecules form a fork in heteroduplexes and are fully matched in homoduplexes. Therefore, the adaptor molecules may be designed in a way that allows a specific nuclease (e.g., the exo III) to attack homoduplexes formed upon hybridization between the nucleic acid populations, but not the heteroduplexes. In particular, the non-complementarity region within the adaptor molecules comprises nucleotides in the range of about 4 nucleotides up to about 10 nucleotides.

In another specific embodiment the adaptor molecules may be chosen so that they are different in length, particularly by about at least 4 nucleotides and about at most 10 nucleotides, at the ends. After hybridization of the two DNAs, a pool may be created in which homo-hybrids stemming from only one DNA population are blunt-ended and hetero-hybrids consist of a mixture of fragments with either 5'overhangs or 3'overhangs. Exposure to exo 3 will attack all the blunt ended and 5'overhang fragments but leave the 3'overhang fragments intact. In this specific embodiment only about 50% of heterohybrids are "rescued" from exo3 digest. The advantage, however, of this method is that it does not rely on non-complementarity of the adaptor molecules but only on difference in sequence length and can, e.g., be advantageous when pooling many different DNA populations each characterized by a differently composed adaptor.

The adaptor molecules may be prepared according to conventional techniques (artificial synthesis) and ligated to the restriction fragments (or to the nucleic acid population, where no restriction step is conducted), by conventional methods (using for instance a ligase enzyme, such as T4 ligase). More specifically, ligation of the adaptor molecule may result in DNA fragments that carry an adaptor sequence at both ends. In a particular embodiment of the method involving an amplification step, the method comprises the ligation of all of the nucleic acids in the various populations to the same adaptor molecule. In an alternative embodiment of the method involving an amplification step, the method comprises the ligation of all of the nucleic acids in each populations to differently labelled adaptor molecule. For the method which does not comprise an amplification step, the method comprises the ligation of all of the nucleic acids in each populations to differently composed adaptor molecules.

Amplification of the nucleic acids (or restriction fragments) may be accomplished by polymerase chain reaction (PCR), according to conventional techniques. Specifically, the amplification may be carried out by polymerase chain reaction using a high fidelity, long-range DNA polymerase. Examples of such polymerases include Pfx polymerase (Invitrogen, Carlsbad, Calif.) and Z-Taq polymerase (TaKaRa). Several amplification cycles may be performed, more particularly from about 25 to about 40 cycles.

Another advantage of the instant invention resides in the use of particular primers for the amplification reaction. The primers may be complementary to at least part of the adaptor molecule. The primers may be any oligonucleotide, specifically having about 5 to about 30 bases, even more specifically about 5 to about 20 bases. The portion of the primer that is complementary to the (portion of the) adaptor molecule may comprise at least about 5 bases, more specifically at least about 10 bases, to ensure sufficient selectivity. Primers may be produced by the skilled person according to conventional techniques known in the art (preferably artificial nucleic acid synthesis).

In a specific embodiment, the primers are labelled, which provides further advantages to the present method. In particular, the introduction of labelled primers for (PCR) amplification allows distinguishing the different DNA populations that are mixed. Indeed, the primer used to amplify each nucleic acid population may exhibit a different label, such as different unique 5' sequences (or some may be labelled and some not), allowing distinguishing the amplified products from each source. If the adaptor molecules are differently composed for each population, the primers for each population are adapted to the adaptor molecules present in each nucleic acid population. This avoids the need for any methylation step. Accordingly, no methylation-specific restriction enzymes are needed and a significant decrease of the cost per experiment can be obtained. Furthermore, the use of labelled primers makes it possible to carry out more than pair-wise comparisons (several individuals included in a reaction, i.e., more than two nucleic acid populations). This may be used to increase the resolution of the method (smaller IBD regions are detected). This feature is especially useful when searching for allelic association.

Moreover, the primers may be designed in a way that allows a homoduplex specific nuclease (e.g., the exo III) to attack homoduplexes formed upon hybridization between the nucleic acid populations, but not the heteroduplexes. Accordingly, the restriction ends play no part in the choice of the restriction enzyme for digestion of the nucleic acid populations. The enzymes may thus be chosen according to practical considerations (size of the generated fragments, specificity for DNA species, enzymatic activity and ease of use).

Primers may be labelled by (i) adding a unique 5'-sequence to each primer, (ii) adding a chemical activity to the primer which provides a means to distinguish between the amplification products from different DNA sources and (iii) adding modified nucleotides into the primer allowing to distinguish between the amplification products from different DNA sources. A specific labelling technique comprises the introduction of a unique 5' sequence to each set of primers.

The identification, isolation or separation of the identical, fully matched, heterohybrid fragments may be performed in several ways. Specifically, the identification comprises the following steps (i) separation of homohybrids from heterohybrids, (ii) (identification and) elimination of mismatched heterohybrids, and iii) identification (or isolation or separation) of the identical heterohybrid fragments.

The heterohybrids may be separated from the homohybrids based on labelling of primers and/or adaptor molecules, as described above. In particular, the separation may be performed based on the use of primers or adaptor molecules with a unique 5' end sequence for each nucleic acid population. According to one particular embodiment, only homohybrids will be blunt ended, i.e., comprise perfectly matched DNA ends (the unique 5' end sequence of the specific primer). Accordingly, all homohybrids may be eliminated by treatment of the hybridization product with an enzyme that specifically digest blunt-ended double stranded DNA fragments, such as Exo III, exonuclease lambda, and T7 exonuclease. Treatment with Exo III results in the formation of single-strands, which can be eliminated through various methods, such as through binding to a single strand-specific matrix.

In this regard, in a specific embodiment, the method of the present invention comprises a) separate ligation of the restriction fragments from different sources using a adaptor molecule with a unique end sequence for each DNA source, b) mixing the ligation products from said different sources carrying unique ends, c) denaturation and rehybridizing said DNAs, d) digesting perfectly matched (particularly blunt ended) DNAs (homoduplexes) by a homoduplexe specific nuclease (particularly a blunt ended nuclease such as Exo III), and e) optionally, elimination of the resulting single strands through binding to a single strand specific matrix.

In another specific embodiment, the method of the present invention comprises a) separate amplification of the restriction fragments from different sources using a primer with a unique 5' sequence for each DNA source, b) mixing the amplification products from said different sources carrying unique 5' ends, c) denaturation and rehybridizing said DNAs, d) digesting perfectly matched (particularly blunt ended) DNAs (homoduplexes) by a homoduplexe specific nuclease (particularly a blunt ended nuclease such as Exo III), and e) optionally, elimination of the resulting single strands through binding to a single strand specific matrix.

In an additional specific embodiment, the method of the present invention comprises a) separate ligation of the restriction fragments from different sources using a adaptor molecule with a unique 5' sequence for each DNA source, b) separate amplification of the restriction fragments from different sources using a adaptor-specific primer for each DNA source, c) mixing the amplification products from the different sources carrying unique 5' ends, d) denaturation and rehybridizing the DNAs, e) digesting perfectly matched (specifically blunt ended) DNAs (homoduplexes) by a homoduplexe specific nuclease (specifically a blunt ended nuclease such as Exo III), and f) optionally, elimination of the resulting single strands through binding to a single strand specific matrix.

The separation of DNA homoduplexes from DNA heteroduplexes may also be performed based on the methylation of one of the two nucleic acid preparations (or restriction fragments). This embodiment may be performed advantageously where the amplification primer or the adaptor molecule comprises a site of recognition of an enzyme that creates 3' sticky ends (such as Aat III). Indeed, in this embodiment, the nucleic acid populations may be digested with any type of restriction enzyme.

Mismatched heterohybrids may be specifically eliminated with mismatch repair enzymes. In particular, the distinction between (or elimination or separation of) mismatched and perfectly matched nucleic acid fragments may be performed using mismatch repair enzymes mutS, mutL and/or mutH, or derivatives or homologues thereof. Derivatives include fragments or variants of the Mut proteins, i.e., any polypeptide or fragment derived there from and retaining the biological activity of the protein. In particular, derivatives retain at least about 80% of the primary structure of the Mut protein. Homologues include proteins exhibiting the same type of enzymatic activity in other biological systems (yeasts, plants, etc.).

In particular, mismatched nucleic acid fragments may be eliminated by incubating the hybridization mixture with MutS (which binds mismatch) and contacting the resulting product with a MutS-binding material (e.g., support, bead, column, etc.).

Mismatched nucleic acid fragments may also be eliminated by incubating the hybridization mixture with MutS, MutL and MutH, resulting in a specific cleavage of mismatched hybrids and subsequent formation of blunt ends, which may be eliminated by treatment with particular enzymes (such as exo III) and elimination of single-strand DNA formed.

In a more specific embodiment, the method comprises separate digestion of the genomic DNAs from at least two different sources with a restriction enzyme, ligation of a differently composed adaptor molecule to these genomic restriction fragments, hybridization of the ligation products from the different DNA sources with each other, separation of homoduplexes from heteroduplexes, preferably based on labelling of adaptor molecules, and identification and elimination of mismatched heterohybrids using the mut SHL proteins; identification of the 100% identical heteroduplex fragments.

In another more specific embodiment, the method comprises separate digestion of the genomic DNAs from at least two different sources with a restriction enzyme, ligation of an adaptor molecule to these genomic restriction fragments, amplification of the adaptor-ligated restriction fragments (particularly by polymerase chain reaction (PCR)), using differently labelled adaptor-specific primers; hybridization of the amplification (e.g., PCR) products from the different DNA sources with each other, separation of homoduplexes from heteroduplexes, specifically based on labelling of primers, identification and elimination of mismatched heterohybrids using the mut SHL proteins, and identification of the 100% identical heteroduplex fragments.

In an additional more specific embodiment, the method comprises separate digestion of the genomic DNAs from at least two different sources with a restriction enzyme, ligation of a differently composed adaptor molecule to these genomic restriction fragments, amplification of the adaptor-ligated restriction fragments (specifically by polymerase chain reaction (PCR)), using adaptor-specific primers; hybridization of the amplification (e.g., PCR) products from the different DNA sources with each other, separation of homoduplexes from heteroduplexes, specifically based on labelling of adaptor molecules and primers, identification and elimination of mismatched heterohybrids using the mut SHL proteins, and identification of the 100% identical heteroduplex fragments.

In a particular embodiment, the steps of separation of homoduplexes from heteroduplexes and identification and elimination of mismatched heterohybrids may be preceded simultaneously. Specifically, the purification of the products may be made by ultra filtration.

As indicated before, the primers may have a sequence that is complementary to at least a part of the adaptor sequence. Furthermore, they may be specifically labelled, thereby providing a means to distinguish between the amplification products from different DNA sources.

In another aspect, the invention resides in a method of genetic analysis comprising a) digestion of DNA from different sources which share a common trait of interest, which trait is suspected to be based on the same genetic change, with an enzyme that, on average, provides medium length DNA fragments (e.g., fragments between about 2 bases to about 10 kb), b) ligation of specific adaptors to these restriction fragments (these adaptors provide a means to introduce a known sequence and a means for later selection in the reaction), c) labelling of at least one of the DNAs from the different sources with a method that allows to distinguish the DNAs from different sources from each other, d) amplification of the so prepared restriction fragments by polymerase chain reaction (PCR), e) mixing the DNAs from different sources and formation of heteroduplexes between the DNA strands from these sources, f) elimination of homoduplexes formed by the renaturation of two DNA strands from the same source, g) elimination of heteroduplexes which have mismatched bases, and h) detection and identification of the resulting 100% identical DNA sequences.

As mentioned above, in a specific embodiment of the invention, the adaptor molecule may include specific sequence features such as the recognition site for mut HL (GATC) and a recognition site for a restriction enzyme creating 3' sticky ends (e.g., aat III).

In another specific embodiment of the present invention one of the DNAs taking part in the procedure is methylated after digestion and adaptor ligation, specifically by using dam methylase. The DNAs from different sources may then be separately amplified by PCR using adaptor-specific oligonucleotide primers. The resulting amplification products are digested with a restriction enzyme creating 3' sticky ends (at least 2 sites/fragment introduced into the adaptor) to protect the fragments from exo III digestion. The DNA fragments from two different sources may then be mixed and hemi-methylated heteroduplexes are formed between the DNA strands by heat denaturation and renaturation under stringent conditions. Casna et al., 14 Nuc. Acids Res., 7285–7303 (1986). Non-methylated and fully methylated homoduplexes may be cut by methylation sensitive restriction enzymes. The cut fragments may then be further digested by exo III exonuclease and the resulting single stranded regions may be eliminated from the reaction mix using some single strand specific matrix known to those skilled in the art (e.g., BND cellulose beads). The remaining heteroduplexes may be a mix of fragments, which are 100% matched and those that have DNA base pair mismatches (due to the difference between individuals). DNA fragments having mismatched DNA sequences may be recognized and cut by adding the mut SHL mismatch repair proteins to the reaction mix. Fragments that were cut may be further digested by exo III exonuclease and single strands may be eliminated as described above.

In a specific embodiment of the invention the method is characterized by the following steps a) digestion of DNA from at least two different sources with a restriction enzyme, b) ligation of differently composed adaptors to the restriction fragments, c) mixing the ligation products from different sources carrying a unique label (e.g., a unique end), d) denaturation and re-hybridization of the DNAs from different sources, e) digestion of perfectly matched (specifically blunt ended) DNAs (homoduplexes) by a homoduplexe specific nuclease (specifically a blunt ended specific nuclease such as exo III exonuclease), f) optionally, elimination of the resulting single strands through binding to a single strand specific matrix, g) recognition and nicking of mismatched heteroduplexes, e.g., by adding the mut SHL proteins to the reaction mix, h) exo III digestion of nicked DNAs, i) elimination of the exo III created single strands through binding to a single strand specific matrix, and j) detection and identification of the remaining 100% matched sequences in the reaction mix.

In an other specific embodiment of the invention, the method is characterized by the following steps a) digestion of DNA from at least two different sources with a restriction enzyme, b) ligation of specific adaptors to the restriction fragments, c) separate amplification of the restriction fragments from the different sources using a primer with a different label (e.g., a unique 5' end) for each DNA of said sources, d) mixing the amplification products from different sources carrying a unique label (e.g., a unique 5' end), e) denaturation and re-hybridization of the DNAs from different sources, f) digestion of perfectly matched (particularly blunt ended) DNAs (homoduplexes) by a homoduplexe specific nuclease (specifically a blunt ended specific nuclease such as exo III exonuclease), g) elimination of the exo III created single strands through binding to a single strand specific matrix, h) recognition and nicking of mismatched heteroduplexes by adding the mut SHL proteins to the reaction mix, i) exo III digestion of nicked DNAs, j) elimination of the exo III created single strands through binding to a single strand specific matrix, and k) detection and identification of the remaining 100% matched sequences in the reaction mix.

In an additional specific embodiment of the invention, the method is characterized by the following steps a) digestion of DNA from at least two different sources with a restriction enzyme, b) ligation of differently composed adaptors to the restriction fragments, c) separate amplification of the restriction fragments from the different sources using an adaptor specific primer for each DNA of the sources, d) mixing the amplification products from different sources carrying a unique label (e.g., a unique 5' end), e) denaturation and re-hybridization of the DNAs from different sources, f) digestion of perfectly matched (specifically blunt ended) DNAs (homoduplexes) by a homoduplexe specific nuclease (specifically a blunt ended specific nuclease such as exo III exonuclease), g) elimination of the exo III created single strands through binding to a single strand specific matrix, h) recognition and nicking of mismatched heteroduplexes, e.g., by adding the mut SHL proteins to the reaction mix, i) exo III digestion of nicked DNAs, j) elimination of the exo III created single strands through binding to a single strand specific matrix, and k) detection and identification of the remaining 100% matched sequences in the reaction mix.

The identified, separated or isolated identical DNA fragments may be further analyzed to determine a gene, mutation, and the like. More particularly, the fragments may be analyzed by sequencing. They may also be analyzed by hybridization with ordered DNA array(s) or coded beads carrying specific DNA sequences.

The invention also relates to kits that may be used to perform the above described genetic analysis techniques. In particular, the invention resides in a kit suitable for genetic analysis as described above, comprising a double stranded adaptor molecule, a specific labelled primer and, optionally, control DNAs and enzymes. Kits of this invention may further comprise a means for the detection of the selected DNA fragments, specifically an ordered DNA array or coded beads carrying specific DNA sequences.

The invention may be used to identify gene or mutations involved in pathology, such as complex pathologies (obesity, asthma, cardiovascular diseases, CNS disorders, etc.). The invention is broadly applicable to the analysis of any genetic material, especially with the objective of identifying (or screening) identical DNA regions present in two (or more) different nucleic acid populations.

The invention has been disclosed broadly and illustrated in reference to representative embodiments described above. Those skilled in the art will recognize that various modifications can be made to the present invention without departing from the spirit and scope thereof. Without further elaboration, it is believed that one skilled in the art, using the preceding description, can utilize the present invention to the fullest extent. The following examples are illustrative only, and not limiting of the remainder of the disclosure in any way whatsoever.

EXAMPLES

Example 1

Identification of Disease-Related Loci in Related Human Individuals

Genomic DNA from at least two related individuals with the same disease phenotype, is extracted by standard methods, e.g., phenol-chloroform extraction. The DNAs are separately cut with a restriction enzyme (e.g., Bam HI) to create restriction fragments with an average size around 4 kb.

To these restriction fragments a solution containing short double stranded oligonucleotides (adaptors) is added. The adaptor molecules have sequence ends complementary to the restriction site sequences to allow ligation. The adaptors are then ligated to the restriction fragments from the genomic DNAs using a common ligase (e.g., T4 ligase). The sequence of the adaptors has been chosen in a way that the sequence includes the recognition site for mut HL, and adapter dimers formed through autoligation of two adaptor molecules are self-complementary and do not compete for primers with the genomic ligation products during PCR.

The adaptor carrying fragments are then, separately for each individual, amplified by PCR using primers that are complementary to a part of the adaptor sequence and that carry unique 5' ends. After several rounds of amplification the PCR products of different individuals differ by their ends in respect to each other. The amplification products are then mixed, heat denatured and allowed to re-anneal using stringent hybridization conditions. Casna et al., supra. This results in the formation of heteroduplexes from the DNAs from different sources (individuals) with forked (single stranded) ends because of the non-complementarity of the primer sequences. In addition, homoduplexes are formed by renaturation between the strands of one individual with itself. These homoduplexes are blunt-ended. To this mixture a solution containing exo III (or an equivalent 3' recessed or blunt-end specific exonuclease) exonuclease is added. The exonuclease digests the blunt ended homoduplexes but not the heteroduplexes with their 3' overhang, creating big single stranded gaps in the homoduplex fragments. These can be eliminated from the reaction mix through binding to a single strand specific matrix (e.g, BND cellulose beads). The remaining heteroduplexes comprise a pool of 100% identical fragments and fragments with base pair mismatches (non-IBD fragments).

A solution containing a mismatch specific enzyme activity (e.g., mut SHL) is added to the mix resulting in the nicking of mismatched heteoduplexes. These nicks are further digested by adding exo III (or an equivalent 3' recessed or blunt-end specific exonuclease) exonuclease to the reaction mix, creating big single stranded gaps in the homoduplex fragments. These may be eliminated from the reaction mix through binding to a single strand specific matrix (e.g., BND cellulose beads). The remaining fragments in the reaction mix constitute a pool of 100% identical DNA hybrids formed between the DNAs of different individuals comprising the loci responsible for the disease phenotype. These fragments may be detected and identified (e.g., by hybridization to a DNA array representing the whole human genome). Comparison of the signals from a number of experiments in different families with the same disease phenotype allows the identification of the regions linked to disease (disease specific genome haplotype).

Example 2

Identification of Disease-Related Loci Using Direct Adaptor Ligation

From a family collection of 100 to 300 families with at least two family members affected by a trait of interest, genomic DNA from at least two related individuals with the same disease phenotype is extracted by standard methods e.g., phenol-chloroform extraction. The DNAs are ordered into standard 96 multi-well plates at a concentration of 50 ng/µl in TE, pH8.0. 1.5 µg of each DNA is separately digested with BamH1 (1000 U/µl, 10× NEB reaction buffer3) in a total volume of 100 µl at 37° C. for 3 hours to create restriction fragments with an average size around 4 kilobases. The reaction is stopped by heat inactivation.

To these restriction fragments a solution containing short double stranded oligonucleotides (adaptors) is added at a concentration of 10 pmol/µl (adapA 5'P-CTAGCAGACAT-GACGTGGTCGTTTTT-3' (SEQ ID No 1), adapB 5'P-CTAGCAGACATGACGTGGTCGCCCC-3' (SEQ ID No 2), further example for adaptor sequences, see infra). The adaptor molecules have sequence ends complementary to the restriction site sequences to allow ligation, but the adaptor sequence for each individual DNA is composed differently and non-homologuous with each other.

The adaptors are then ligated to the restriction fragments from the genomic DNAs using T4 ligase (50 U, 1 mM ATP and 1× reaction buffer) at 15° C. for 1 hour. Non-incorporated adaptor molecules are eliminated from the mixture by ultra filtration. The adaptor ligated products are then mixed, alkaline denatured (NaOH 5M, final concentration 0.5M) and allowed to re-anneal in a specific hybridization solution (FPERT) overnight at room temperature. Casna et al., supra. This results in the formation of heteroduplexes from the DNAs from different sources (individuals) with forked (single stranded) ends because of the non-complementarity of the adaptor sequences. In addition homoduplexes are formed by renaturation between the strands of one individual with itself. These homoduplexes are blunt-ended. After hybridization 750 µl of chloroform are added to the solution and the aqueous phase is transferred to a ultrafiltration plate. 50 µl of washing solution (20% Tween 20, TE pH 8.0) is added to each well and the DNA is then purified to remove solvents and salts from the mixture.

A solution containing 30% BNDC in TE pH8.0 is then added to the solution, incubated at 37° C. for 15 minutes and again ultra filtrated. To this mixture a solution containing 1x reaction buffer, 1 unit each of mut S, L and H and exo III (100 U/µl) exonuclease is added. The solution is incubated at 37° C. for 15 to 30 minutes and the reaction stopped by heating to 65° C. The exonuclease digests the blunt ended homoduplexes but not the heteroduplexes with their "forked" overhang, creating big single stranded gaps in the homoduplex fragments. The remaining heteroduplexes comprise a pool of 100% identical fragments and fragments with base pair mismatches (non-IBD fragments). The mismatch specific enzymes (E. coli mut SHL) result in the nicking of mismatched heteoduplexes, i.e., the non-IBD DNA. 310 µl of a 30% BNDC solution in TE pH8.0 is then added to the reaction mix, incubated at 37° C. for 15 minutes and ultra filtrate after adding washing solution (20% Tween 20 TE pH 8.0) to eliminate single stranded DNA. The remaining fragments in the reaction mix constitute a pool of 100% identical DNA hybrids formed between the DNAs of different individuals comprising the loci responsible for the disease phenotype.

The remaining fragments and a control DNA are labelled with Cy5 and Cy3 fluorescent dye respectively by random priming (Sambrook et al., Molecular Cloning: A Laboratory Manual, Volumes I–III, (2nd ed. Cold Spring Harbor Laboratory 1989). The two labelled solutions are then co-hybridized against a DNA array representing on its surface landmarks covering the whole human genome in regular intervals (e.g., 1 mega base). The retained identity by descent regions for each pair are then determined by scoring the fluorescent signals as ratios between the Cy5 and Cy3 signals. Statistical comparison of the signals from all experiments in different families with the same disease phenotype allows the identification of the regions linked to disease.

Figure 2:
FIG. 2 depicts the protection from exonuclease 3 digestion by "forked" sequence ends. Lane 1: Molecular weight marker; Lanes 2, 4 and 5: substrates ligated to adaptors A and B with non-homologous ("forked") ends after exonuclease 3 digestion; Lanes 3, 6 and 7: same substrates after blunt-ended ligation with either adaptor A (lane 3) or adaptor B (lane 6 and 7). The "forked" ends efficiently protect the double stranded DNA molecule from exonuclease 3 digestion.

FIG. 1 illustrates the efficiency of the method according to the present invention for recovering the IBD allele. More particularly, FIG. 2 illustrates the efficiency of the elimination of the homoduplexes by using differently composed adaptors. For example, 89 families of German origin (117 independent sib-pairs) concordant for massive obesity (as defined by a body mass index >90% ile) were submitted to the process according the present example. The resulting IBD enriched DNA fractions were then labelled with Cy5 fluorescent dyes and hybridized against a DNA array consisting of 99 chromosome 10 derived human BAC clones resulting in an average chromosome-wide resolution of 250 kb. Non-selected DNA labelled with Cy3 was used to normalize the signal values and compute ratios for each clone. Clustering of the ratio results were then performed to determine the IBD status for each clone and pair.

Figure 3:
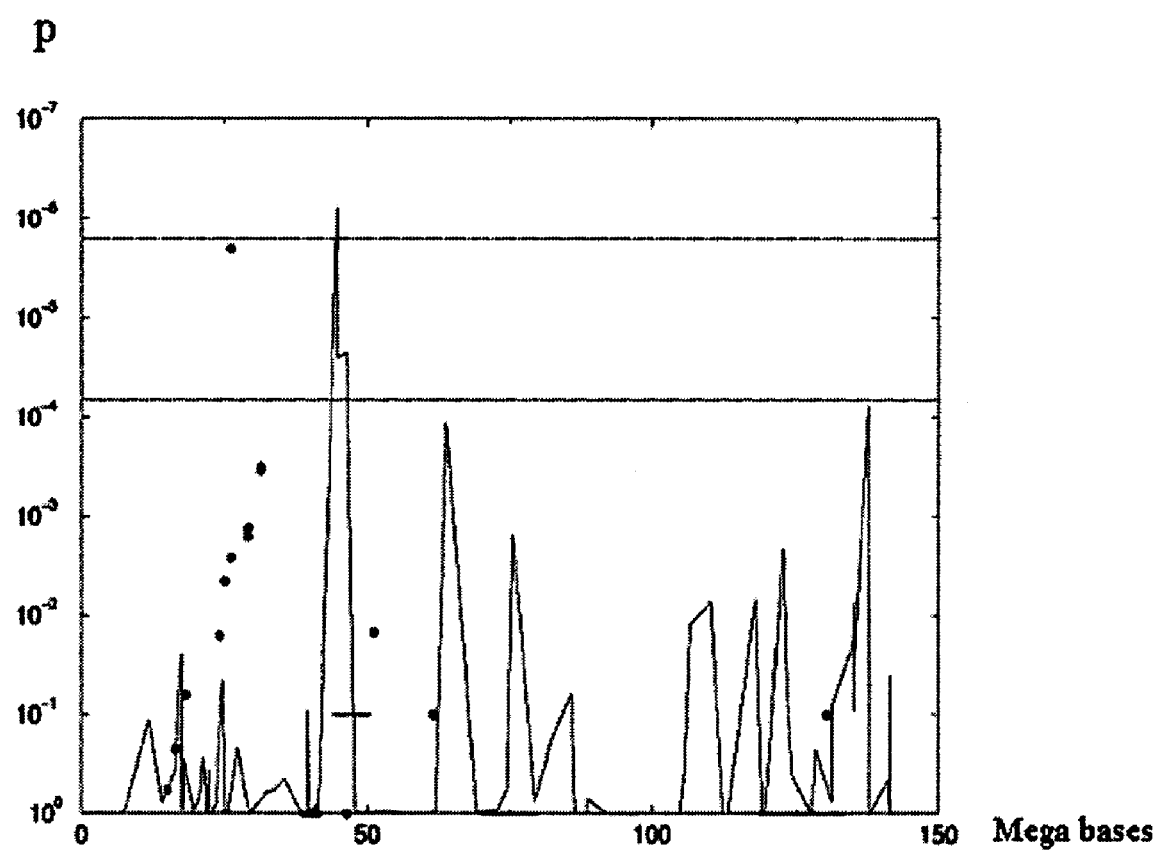
FIG. 3 shows the graphical presentation of the linkage peak on chromosome 10q11. The curves depict the linkage results for the procedure according to example 2, the dots depict results for microsatellite markers in the region. The dotted lines correspond to the Lander and Krygliak thresholds for suggestive evidence and evidence for linkage respectively. Linkage results obtained for 99 BAC clones on human chromosome 10 after the procedure according to example 2. Each point on the x-axis corresponds to a clone. Several clones are indicated by their library name for better orientation (e.g., RP11-70B16). The two horizontal lines at $3*10-4$ and $2*10-5$ for the p-values correspond to the significance levels for significant and suggestive linkage proposed by Krygliak and Lander for whole genome screens. The two highest peaks delimit the interval of clones with evidence for linkage after the analysis according to example 2.

By applying this procedure, several BAC clones spanning an approximately 4 mega-base region on chromosome 10 (bases 44000000 to 48000000) were identified, that showed significant evidence for linkage to obesity (FIG. 3).

Other adaptor molecules can also be used in the process according to the present example. For instance, see below other couples of adaptor molecules:

```
Couple 1:

5'-CTAGCAGACATGACGTGGTCGCCCATGATG-3'    (SEQ ID No 3)

5'-CTAGCAGACATGACGTGGTCGAAATACTAC-3'    (SEQ ID No 4)

Couple 2:

5'-CTAGCAGACATGACGTGGTCGAAAAAAAAAA-3'   (SEQ ID No 5)

5'-CTAGCAGACATGACGTGGTCGCCCCCCCCCC-3'   (SEQ ID No 6)
```

-continued

Couple 3:

5'-TTTTTUGACCACGTCATGTCTG-3' (SEQ ID No 7)

5'-AAAAAUGACCACGTCATGTCTG-3' (SEQ ID No 8)

A combination of these couples of adaptor molecules may be used when more than two populations are involved.

Example 3

Identification of Quantitative Trait Loci (QTL's) in Domestic Animals

One aim in modern agricultural animal breeding is the selection for or against certain quantitative trait phenotypes (e.g., muscle mass, milk quantity, concentration of casein in milk for cheese production etc.). The genetic mechanisms leading to a trait are often complex with several loci implicated. These loci can be identified using the procedure of the present invention.

In this example genomic DNA from different animals concordant for a trait of interest (e.g., higher than average casein concentration in milk) is restricted using a restriction endonuclease that produces on average fragments around 4 kilobases (e.g., Bam HI). To these restriction fragments a solution containing short double stranded oligonucleotides (adaptors) is added. The adaptor molecules have sequence ends complementary to the restriction site sequences to allow ligation. The adaptors are then ligated to the restriction fragments from the genomic DNAs using a common ligase (e.g., T4 ligase). The sequence of the adaptors has been chosen in a way that a) the sequence includes the recognition site for mut HL, and b) adapter dimers formed through autoligation of two adaptor molecules are self-complementary and do not compete for primers with the genomic ligation products during PCR.

The adaptor carrying fragments are then separately amplified by PCR using primers that are complementary to a part of the adaptor sequence but that carry unique 5' ends. After several rounds of amplification the PCR products from the DNAs of different animals differ by their ends in respect to each other. The amplification products are then mixed, heat denatured and allowed to re-anneal using stringent hybridization conditions. Casna et al., supra. This results in the formation of heteroduplexes between the DNAs from different animals, with forked (single stranded) ends because of the non-complementarity of the primer sequences. In addition homoduplexes are formed by renaturation between the strands of a given animal with itself. These homoduplexes are blunt-ended. To this mixture a solution containing exo III (or an equivalent 3' recessed or blunt-end specific exonuclease) exonuclease is added. The exonuclease digests the blunt ended homoduplexes but not the heteroduplexes with their 3' overhang, creating big single stranded gaps in the homoduplex fragments. These can be eliminated from the reaction mix through binding to a single strand specific matrix (e.g., BND cellulose beads). The remaining heteroduplexes comprise a pool of 100% identical fragments and fragments with base pair mismatches (non-IBD fragments).

A solution containing the mismatch repair enzymes mut SHL is added to the mix resulting in the nicking of mismatched heteroduplexes at a specific recognition site (GATC). These nicks are further digested by adding exo III (or an equivalent 3' recessed or blunt-end specific exonuclease) exonuclease to the reaction mix, creating big single stranded gaps in the homoduplex fragments. These may be eliminated from the reaction mix through binding to a single strand specific matrix (e.g., BND cellulose beads). The remaining fragments in the reaction mix constitute a pool of 100% identical DNA hybrids formed between the DNAs from different animals comprising the loci responsible for the quantitative trait of interest. These can be hybridized against an array containing a representative selection of sequences covering the whole genome of the animal. As in this case, non-related animals may be used to identify the QTL's. The IBD regions should be small, i.e., a very limited number of experiments should be necessary (only one in the best case) to identify the genes responsible for the trait. The introduction of a control animal discordant for the trait of interest may further enhance the resolution of the system.

Example 4

Fine Mapping of a Disease Linked Region

Depending on the complexity and heterogeneity of a disease phenotype the locus definition after a GMS experiment as described in example 1 may vary between several kilobases and some megabases. In the latter case further experiments may be carried out to decrease the genetic interval in which the disease gene is located. The inventive procedure may also be used to fine map the gene(s) of interest.

DNA from different non-related individuals that have been shown to be linked to the same disease loci is extracted and digested by a suitable restriction endonuclease (e.g., 4 base recognition site cutter) to produce well length defined fragments. To these restriction fragments, a solution containing short double stranded oligonucleotides (adaptors) is added. The adaptor molecules have sequence ends complementary to the restriction site sequences to allow ligation. The adaptors are then ligated to the restriction fragments from the genomic DNAs using a common ligase (e.g., T4 ligase). The sequence of the adaptors has been chosen in a way that a) the sequence includes the recognition site for mut HL, and b) adapter dimers formed through autoligation of two adaptor molecules are self-complementary and do not compete for primers with the genomic ligation products during PCR.

The adaptor carrying fragments are then, separately for each individual, amplified by PCR using primers that are complementary to a part of the adaptor sequence and that carry unique 5' ends. After several rounds of amplification the PCR products of different individuals differ by their ends in respect to each other. The amplification products are then mixed, heat denatured and allowed to re-anneal using stringent hybridization conditions. Casna et al., supra. Depending on restrictions for the choice of the unique 5' ends for the primers, the amplification products of several individuals can be mixed, enhancing the resolution. The mixing of the PCR fragments results in the formation of heteroduplexes from the DNAs from different sources (individuals) with forked (single stranded) ends because of the non-complementarity of the primer sequences. In addition homoduplexes are formed by renaturation between the strands of one individual with itself. These homoduplexes are blunt-ended. To this mixture a solution containing exo III (or an equivalent 3' recessed or blunt-end specific exonuclease) exonuclease is added. The exonuclease digests the blunt ended homoduplexes but not the heteroduplexes with their 3' overhang, creating big single stranded gaps in the homoduplex fragments. These can be eliminated from the reaction mix through binding to a single strand specific matrix (e.g., BND cellulose beads). The remaining heteroduplexes comprise a pool of 100% identical fragments and fragments with base pair mismatches.

A solution containing the mismatch repair enzymes mut SHL is added to the mix resulting in the nicking of mismatched heteoduplexes at a specific recognition site (GATC). These nicks are further digested by adding exo III (or an equivalent 3' recessed or blunt-end specific exonuclease) exonuclease to the reaction mix, creating big single stranded gaps in the homoduplex fragments. These may be eliminated from the reaction mix through binding to a single strand specific matrix (e.g., BND cellulose beads). The remaining fragments in the reaction mix constitute a pool of small 100% identical DNA hybrids formed between the DNAs of different individuals comprising the loci responsible for the disease phenotype. As there is virtually no IBD between these individuals only a very small number of relatively short fragments should be identical (this is basically a very efficient way to search for allelic association). A dense locus specific array of DNA sequences may be used to detect and identify sequences within the pool of identical DNAs. As the sequences of the array are known, they may be used to directly sequence the fragments from the GMS procedure to identify open reading frames (ORF's) and the genes of interest.

Example 5

Direct Elimination of Mismatched Heteroduplexes from a Solution

Genomic DNA from at least two related individuals with the same disease phenotype is extracted by standard methods e.g., phenol-chloroform extraction. The DNAs are separately cut with a restriction enzyme (e.g., Bam HI) to create restriction fragments with an average size around 4 kb. To these restriction fragments a solution containing short double stranded oligonucleotides (adaptors) is added. The adaptor molecules have sequence ends complementary to the restriction site sequences to allow ligation. The adaptors are then ligated to the restriction fragments from the genomic DNAs using a common ligase (e.g., T4 ligase). The sequence of the adaptors has been chosen in a way that the sequence includes the recognition site for mut HL, and adapter dimers formed through autoligation of two adaptor molecules are self-complementary and do not compete for primers with the genomic ligation products during PCR.

The adaptor carrying fragments are then, separately for each individual, amplified by PCR using primers that are complementary to a part of the adaptor sequence and that carry unique 5' ends. After several rounds of amplification the PCR products of different individuals differ by their ends in respect to each other. The amplification products are then mixed, heat denatured and allowed to re-anneal using stringent hybridization conditions. Casna et al., supra. This results in the formation of heteroduplexes from the DNAs from different sources (individuals) with forked (single stranded) ends because of the non-complementarity of the primer sequences. In addition homoduplexes are formed by renaturation between the strands of one individual with itself. These homoduplexes are blunt-ended. To this mixture a solution containing exo III (or an equivalent 3' recessed or blunt-end specific exonuclease) exonuclease is added. The exonuclease digests the blunt ended homoduplexes but not the heteroduplexes with their 3' overhang, creating big single stranded gaps in the homoduplex fragments. These can be eliminated from the reaction mix through binding to a single strand specific matrix (e.g., BND cellulose beads). The remaining heteroduplexes comprise a pool of 100% identical fragments and fragments with base pair mismatches (non-IBD fragments).

A solution containing the mismatch recognizing protein mut S is added to the reaction mix. Mut S binds to the mismatched DNA at the site of the mismatch. The protein/DNA complex may then be eliminated from the reaction mix by specific binding of mut S to a matrix (e.g., antibody carrying column, protein binding membrane). This procedure omits the mut LH nicking steps and the second exo III digestion as well as the need for a single strand binding matrix to eliminate the products resulting from the exonuclease digestion. The remaining identical DNA heteroduplex fragments may be detected and identified as pointed out in example 1.

The disclosures of all references and publications cited above are expressly incorporated by reference in their entireties to the same extent as if each were incorporated by reference individually. Various modifications and variations of the described methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention, which are obvious to those skilled in molecular biology or related fields, are intended to be within the scope of the following claims.

What is claimed is:

1. A method for the identification, isolation or separation of identical nucleic acid fragments from a mixture of at least two nucleic acid populations, comprising:
   a) digesting separately nucleic acids of said at least two populations with at least one restriction enzyme;
   b) ligating a blunt-ended adaptor sequence to the restriction fragments resulting from the digestion in step (a), said adaptor sequence having a unique 5' end sequence for each nucleic acid population;
   c) mixing the ligation products resulting from the ligation in step (b), from said at least two nucleic acid populations each carrying adaptor sequences with unique 5' end sequences;
   d) denaturing and re-hybridizing the mixture of nucleic acids resulting from the mixing in step (c) to generate a mixture comprising homoduplexes and heteroduplexes;
   e) digesting perfectly matched blunt-ended homoduplexes by a blunt ended specific nuclease;
   f) eliminating mismatched heteroduplexes with mismatch repair enzymes; and
   g) identifying, isolating or separating fully-matched heteroduplexes, thereby identifying, isolating or separating nucleic acid fragments that are identical between said at least two nucleic acid populations.

2. The method of claim 1, wherein the nucleic acid populations are human genomic DNA populations, from different subjects having a common trait of interest.

3. The method of claim 1, wherein the nucleic acid populations comprise selected chromosome(s).

4. The method of claim 1, wherein two or more nucleic acid populations from different sources are used.

5. The method of claim 1, wherein the adaptor sequence comprises a recognition site for mut HL.

6. The method of claim 5, wherein the adaptor molecule is a 5–100 base long double-stranded DNA fragment comprising at least one GATC motif.

7. The method of claim 1, wherein the adaptor sequence is labeled by a method selected from the group consisting of (i) adding a unique end sequence to each adaptor, (ii) adding a chemical activity to the adaptor which provides a means to distinguish between the ligation products from different nucleic acid populations and (iii) adding modified nucleotides into the adaptor allowing to distinguish between the ligation products from different nucleic acid populations.

8. The method of claim 1, wherein the nuclease is exonuclease III.

9. The method according to claim 1, wherein said adaptor sequences comprise unique 5' end sequences of at least 4 nucleotides up to 10 nucleotides.

10. The method of claim 1, wherein, in step (f), mismatched nucleic acid fragments are eliminated by incubating the hybridization mixture with MutS, MutL and MutH.

11. The method of claim 1, further comprising after step (e) a step of eliminating newly created single strands.

12. The method of claim 11, wherein said step of eliminating newly created single strands comprises binding said strands to a single strand specific matrix.

* * * * *

SEQUENCE LISTING

```
<160> NUMBER OF SEQ ID NOS: 8

<210> SEQ ID NO 1
<211> LENGTH: 26
<212> TYPE: DNA
<213> ORGANISM: artificial sequence
<220> FEATURE:
<223> OTHER INFORMATION: adaptor
```

-continued

```
<400> SEQUENCE: 1
ctagcagaca tgacgtggtc gttttt                                          26

<210> SEQ ID NO 2
<211> LENGTH: 25
<212> TYPE: DNA
<213> ORGANISM: artificial sequence
<220> FEATURE:
<223> OTHER INFORMATION: adaptor

<400> SEQUENCE: 2
ctagcagaca tgacgtggtc gcccc                                           25

<210> SEQ ID NO 3
<211> LENGTH: 30
<212> TYPE: DNA
<213> ORGANISM: artificial sequence
<220> FEATURE:
<223> OTHER INFORMATION: adaptor

<400> SEQUENCE: 3
ctagcagaca tgacgtggtc gcccatgatg                                      30

<210> SEQ ID NO 4
<211> LENGTH: 30
<212> TYPE: DNA
<213> ORGANISM: artificial sequence
<220> FEATURE:
<223> OTHER INFORMATION: adaptor

<400> SEQUENCE: 4
ctagcagaca tgacgtggtc gaaatactac                                      30

<210> SEQ ID NO 5
<211> LENGTH: 31
<212> TYPE: DNA
<213> ORGANISM: artificial sequence
<220> FEATURE:
<223> OTHER INFORMATION: adaptor

<400> SEQUENCE: 5
ctagcagaca tgacgtggtc gaaaaaaaaa a                                    31

<210> SEQ ID NO 6
<211> LENGTH: 31
<212> TYPE: DNA
<213> ORGANISM: artificial sequence
<220> FEATURE:
<223> OTHER INFORMATION: adaptor

<400> SEQUENCE: 6
ctagcagaca tgacgtggtc gccccccccc c                                    31

<210> SEQ ID NO 7
<211> LENGTH: 22
<212> TYPE: DNA
<213> ORGANISM: artificial sequence
<220> FEATURE:
<223> OTHER INFORMATION: adaptor

<400> SEQUENCE: 7
tttttugacc acgtcatgtc tg                                              22
```

```
-continued

<210> SEQ ID NO 8
<211> LENGTH: 22
<212> TYPE: DNA
<213> ORGANISM: artificial sequence
<220> FEATURE:
<223> OTHER INFORMATION: adaptor

<400> SEQUENCE: 8
aaaaaugacc acgtcatgtc tg                                              22
```